United States Patent [19]
Barkley et al.

[11] Patent Number: 4,698,485
[45] Date of Patent: Oct. 6, 1987

[54] HEATER DEVICE

[75] Inventors: Vincent P. Barkley, Arlington, Va.; William J. Siegel, Silver Spring, Md.

[73] Assignee: Pace Incorporated, Laurel, Md.

[21] Appl. No.: 762,869

[22] Filed: Aug. 6, 1985

[51] Int. Cl.[4] ............................ H05B 3/20; B23K 1/12
[52] U.S. Cl. ........................................ 219/228; 228/20
[58] Field of Search ............... 228/180.2, 20; 219/228, 219/280

[56] References Cited

U.S. PATENT DOCUMENTS

| | | | |
|---|---|---|---|
| 1,955,240 | 4/1934 | Kenney | 219/228 |
| 3,094,606 | 6/1963 | Ferris | 219/228 |
| 3,948,429 | 4/1976 | Davies et al. | 219/228 |
| 4,552,300 | 11/1985 | Zovko et al. | 228/20 |

Primary Examiner—Donald A. Griffin
Attorney, Agent, or Firm—Gerald J. Ferguson, Jr.; Ronni S. Malamud; Michael P. Hoffman

[57] ABSTRACT

Heater device suitable for heating a fluid such as air to be contacted with a printed circuit board for melting solder or the like thereon. The device comprises two heat exchange elements having at least one passage through which fluid to be heated passes. A stainless steel etched foil heater is disposed in a plane between the first and second heat exchange elements, and a fluid entry port is provided in flow communication with the first and second heat exchange elements for admitting fluid to be heated into the at least one passage. A fluid exit port is provided in flow communication with the at least one passage for passing heated fluid from the passage to the substrate to melt the solder or the like thereon. The fluid entering through the fluid entry port and exiting through the fluid exit port flows in generally the same direction as the plane of the heater.

14 Claims, 7 Drawing Figures

FIG. 1
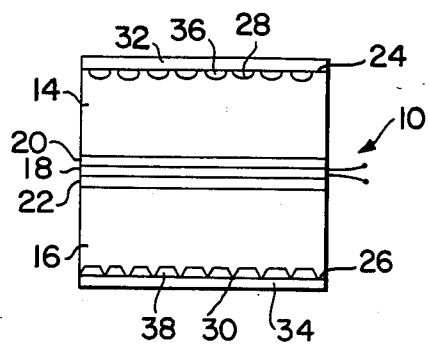
FIG. 2
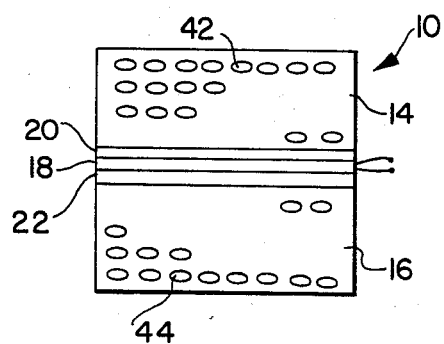
FIG. 3
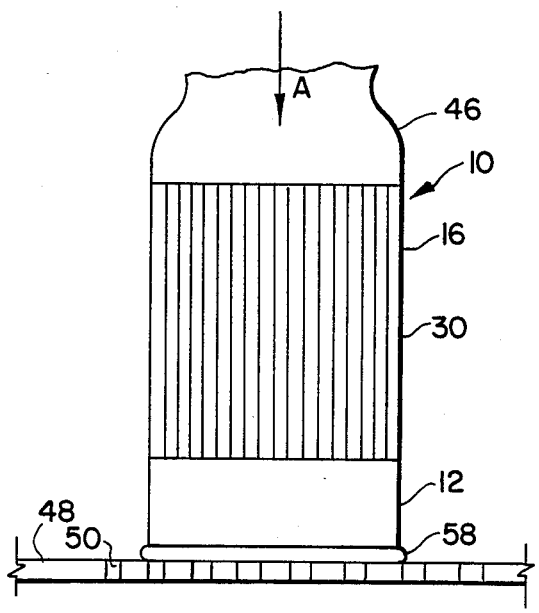
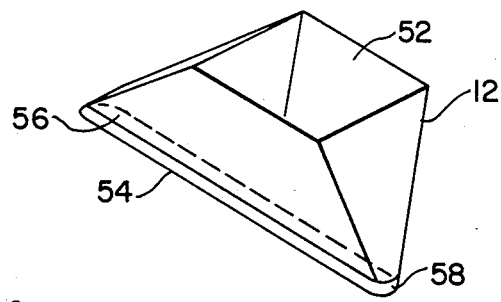
FIG. 4

HEATER DEVICE

The present invention relates to heating apparatus, and more particularly to a heating device suitable for heating a fluid such as air to be contacted with a substrate such as a printed circuit board for melting solder or the like on the substrate.

BACKGROUND OF THE INVENTION

Devices suitable for use in removing or installing modular electronic components from a substrate such as a printed circuit board generally fall into two categories, namely those which use a heated head which contacts each terminal to melt the solder, and those which use a blast of hot air to melt the solder. The former devices are generally very complex and employ a heated head having a plurality of spaced-apart fingers, each of which must be separately aligned with each terminal around the component to simultaneously heat the solder. The component is then withdrawn from the substrate by vacuum suction or other suitable mechanical means. The procedure is reversed for installing a component.

The latter devices direct a blast of hot air at the terminals from a source above the component to simultaneously melt the solder on each of the terminals. Examples of such devices are disclosed in U.S. Pat. Nos. 4,295,596 and 4,366,925. The devices in each of those two patents operate by directing a blast of hot air onto the terminals of a component, followed by removal of the component either mechanically or by the application of suction.

A disadvantage associated with the prior devices is that the heating source for the air is remote from the point at which the hot air is directed towards the terminals of the component, and as a result significant variations in temperature of the air are observed when the heater is turned on and air flows through the device (the "run" time) and when the heater is turned off (the "idle" time) when air in the apparatus is permitted to cool down. As a result of this, when the heater is again switched on, there is a lag time during which the air is again raised to the solder melting temperature, and this results in increased energy consumption and time delay.

It is therefore a primary object of the present invention to provide an improved heating device suitable for use in the installation and removal of electronic components from circuits printed on a substrate.

It is another object of the present invention to provide a heating device which employs a heat exchange element for heating fluid, typically air, immediately prior to directing the heated air towards the terminals of the component on the substrate.

It is yet another object of the present invention to provide a heating device for directing heated air towards the plated-through holes remaining in a printed circuit board after removal of components from the board to melt and remove solder remainining in the holes.

It is a yet further object of the present invention to provide a heating device utilizing a heat conductive foil as a heat exchange element.

It is a further object of the present invention to provide a heating device suitable for heating a substrate on the side opposite to that which is being heated (to facilitate attachment or removal of components from the board), to reduce thermal shock and preheat the substrate.

BRIEF DESCRIPTION OF THE INVENTION

According to one aspect of the present invention, there is provided a heater device suitable for heating a fluid, typically air, to be contacted with a substrate, such as a printed circuit board, for melting solder or the like thereon. The heater device comprises a heat exchange means for heating the fluid to be contacted with the substrate. The heat exchange means includes first and second heat exchange elements, with the heat exchange elements having at least one passage through which fluid to be heated passes. A heating means is disposed in a plane between the first and second heat exchange elements, and fluid entry means is provided in flow communication with the first and second heat exchange elements for admitting fluid to be heated into the at least one passage. Fluid exit means are provided in flow communication with the at least one passage for passing heated fluid from the at least one passage to the substrate to melt the solder on the substrate. The fluid entering through the fluid entry means and exiting through the fluid exit means flows in generally the same direction as the plane of the heating means.

In another embodiment, a heater device is provided having a heat exchange means fabricated from a heat conductive foil material, such as a metal foil. Preferably, the heat exchange means includes first and second foil heat exchange elements, with each foil heat exchange element defining a series of corrugations. A cover plate is provided over the corrugations to define a series of passages through which fluid to be heated passes.

In yet another heater device, a sleeve member is provided having a central bore which, according to a preferred embodiment, is threaded internally. A heating means is received within the threaded central bore to define a passageway extending between the central bore and the heating means along the path of the thread. Fluid to be heated enters the passageway at one end and travels adjacent the heating means along the passageway in contact with the heater means.

BRIEF DESCRIPTION OF THE DRAWINGS

The invention of the present application will now be described in more detail with reference to preferred embodiments, given only by way of example, and with reference to the accompanying drawings, in which:

FIG. 1 is a plan view of a heater device of the invention;

FIG. 2 is a plan view of an alternative heater device of the invention;

FIG. 3 is a side elevation of the device shown in FIG. 1 with a cover plate removed;

FIG. 4 is a perspective view of a nozzle for using in conjunction with the heater device shown in FIG. 1;

DETAILED DESCRIPTION OF THE INVENTION

Figure 5:
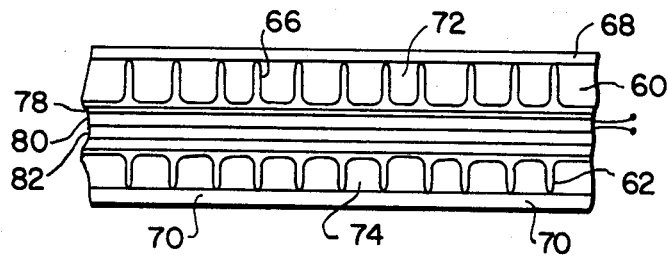
FIG. 5 is a plan view of a yet further alternative embodiment of the present invention.

The present invention describes further embodiments of the invention described and claimed in co-pending application Ser. No. 742,702, filed June 7, 1985, still pending. That application relates to heater devices suitable for use in conjunction with an apparatus for attaching modular electronic components to or removing them from a substrate, and the entire disclosure of that application is hereby incorporated by reference into the present application.

In the following description, reference will be made to air as the fluid being heated. However, it will be appreciated that the invention is not limited to the use of air, and other fluids such as inert gases, including nitrogen, oxygen and carbon dioxide, maybe used, if desired.

Referring, now, to the drawings, and in particular to FIGS. 1 through 4, there is shown a heater device, generally referenced 10, attached to a nozzle 12. The heater device 10 comprises two heat exchange elements 14, 16, with a heater 18 disposed between the elements. The heater 18 is preferably a foil heater, especially a stainless steel etched foil heater, and is preferably electrically insulated from the heat exchange elements 14, 16 by insulating layers 20, 22, suitably mica layers. A typical example of a suitable foil heater 18 is described in co-pending application Ser. No. 742,702, referred to above. Heat generated by the foil heater 18 is transmitted through the insulating layers 20, 22 into the heat exchange elements 14, 16 to effect conduction heating of the heat exchange elements.

Each heat exchange element 14, 16 is of low mass, and is preferably formed of metal, for example bronze or tellurium-copper alloy. In the embodiment shown in FIG. 1, each element is provided on the surface 24, 26 with a plurality of channels 28, 30 extending longitudinally along the length of each heat exchange element, and parallel to the plane of the heater 18. The channels 28, 30 may be semicircular in cross section as shown in the heat exchange element 14 in FIG. 1, or the channels may be trapezoidal in cross section, with the shorter parallel side of the trapezium forming a base of the channel, as shown in the heat exchange element 16 in FIG. 1. It will be appreciated that other channel configurations may be employed to achieve the desired heating effect, for example serrations or grooves in the surfaces 24, 26, if desired.

A cover plate 32 is provided on the heat exchange element 14 covering the channel 28, to define passages 36 through which fluid to be heated passes. Similarly, a cover plate 34 is disposed over the channels 30 to define passages 38 through which fluid to be heated passes.

In the embodiment shown in FIG. 2, a series of apertures 42, 44 are provided extending through the heat exchange elements 14, 16. The apertures 42, 44 may be of any desired cross sectional shape, and are typically circular in cross section to provide cylindrical passages extending through the heat exchange elements 14, 16.

Referring to FIG. 3, there is shown the embodiment of FIG. 1 with the cover plate 34 removed, exposing the channels 30. Fluid entry means 46 is provided in flow communication with the channels 30 and fluid enters the channels 30 (as well as the channel 28) in the direction of arrow A. Fluid which has been heated exits from the channels 30 and proceeds towards a substrate 48 through nozzle 12. It will be appreciated that it is not a critical requirement that a nozzle be provided, but a nozzle is desirable in order to more effectively focus the heated fluid as it exits from the heat exchange elements 14, 16. In the embodiment shown in FIG. 3, the substrate 48 contains a series of plated-through holes 50 as a result removal of components from the substrate 48, A blast of heated fluid is directed by the nozzle 12 through the holes 50 to melt and remove solder remaining in the holes and in the vicinity of the holes, by blowing the solder through the holes and out through the other side of the substrate. It will be appreciated, however, that while the heater device of the present invention is useful for removing residual solder from through-holes in a substrate, this is not the only use for which the present device can be used. Thus, for example, the device may also be used for heating fluid to be contacted with the terminals of modular electronic components to facilitate attachment of the components to a printed circuit board or removal therefrom, by attachment of an appropriately shaped nozzle to the device.

FIG. 4 shows one example of a nozzle which can be attached to the heater device of the invention. The nozzle 12 shown in FIG. 4 has a fluid entrance 52 and a fluid exit 54, with the fluid exit defining a narrow elongate opening 56, so that the fluid heated by the heat exchange means exits as a blast of fluid through the narrow elongate opening. The narrow elongate opening facilitates the nozzle to be accurately aligned over a series of holes from which residual solder is to be removed, and concentrates the blast of heated fluid specifically through those holes. In order to improve the delivery of heated fluid through the holes 50, the nozzle 12 is preferably provided with a compliant material 58 about the periphery of the narrow elongate opening 56 in order to provide a good seal between the nozzle 12 and the board 48 (see FIG. 3). Any suitable heat resistant compliant substance may be employed as the compliant material 58, for example silicone rubber.

FIG. 5 shows an alternative heater device comprising heat exchange elements 60, 62 formed from a heat conductive foil material, typically stainless steel. As can be seen from FIG. 5, the foil heat exchange elements are configured to define a series of corrugations 64, 66, and a cover plate 68, 70 is provided, respectively over the corrugations 64, 66 to define passageways 72, 74 through which fluid to be heated passes. A heater 76, e.g. a foil heater, is disposed between the heat exchange elements 60, 62, and insulating layers 78, 80, typically formed of mica, are provided on either side of the heater 76. A nozzle, such as 12 shown in FIG. 3 may be provided in flow communication with the heater device of FIG. 5, if desired.

Figure 6:
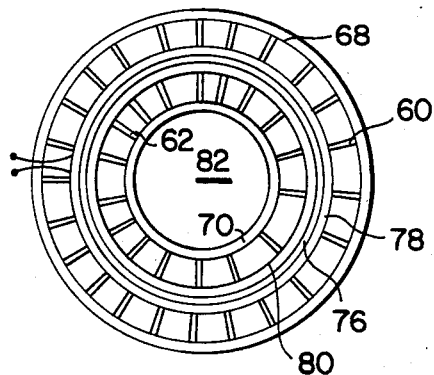
FIG. 6 is a plan view of the heater device shown in FIG. 5 disposed in an annular configuration.

While the overall configuration of the heater device shown in FIG. 5 is not critical, it is preferred to provide the heater device in an annular configuration as shown in FIG. 6. This in particular facilitates delivery of heated fluid to the printed circuit board, while at the same time permitting the operator to view the circuit board through the aperture 82 formed as a result of the heater device being disposed in an annular configuration.

FIG. 5 shows the corrugations 64, 66 forming passages having an approximately square cross-section. However, the cross-sectional configuration of the passages 72, 74 is not critical, provided the foil heat exchange elements have sufficient mass to load the heater 76.

It is also to be noted that an advantage associated with the device illustrated in FIGS. 1 through 3 is that, in use, the device does not totally obscure the user's view of the substrate. This enables the operator to easily observe the substrate from above the heater device, and facilitates accurate location of the nozzle 12 over the components or holes to be heated.

Figure 7:
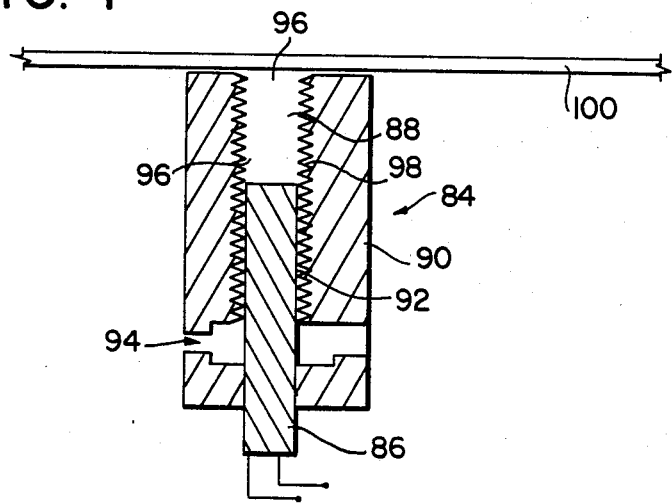
FIG. 7 is a cross-sectional side elevation of another heater device of the present invention.

Referring to FIG. 7, there is shown a heater device generally referenced 84 having a heater 86 disposed within a central bore 88 of a sleeve 90. The heater 86 is preferably a cylindrical cartridge heater, and the sleeve 90 defines a passageway 92 extending along the outer surface of the heater 86 for heating air fluid passing through the passageway. Fluid enters the passageway at entry port 94 and exits through exit port 96 after passing through the passageway 92. In the embodiment shown in FIG. 7, a helical passageway is formed by the sleeve 90 having a thread 98 provided on an inner surface of the sleeve 90, with the heater 86 being disposed in contact with the threads as shown in FIG. 7. However, it will be appreciated that the passageway 92 could equally be formed by providing a thread on the external surface of the heater 86 instead of the inner surface of the sleeve 90.

While the heater 84 shown in FIG. 7 may be used for any heating purposes, a preferred use is to place the heater below a substrate 100 which is to be heated, in order to pre-heat the substrate, and thereby reduce any thermal shock arising from the substrate being heated on the other side. In this regard, the heater 84 is particularly suitable to use in heating the substrate and/or table on which the substrate is supported in the apparatus described and claimed in application Ser. No. 649,065, filed Sept. 10, 1984. For completeness, the disclosure of that application is hereby incorporated by reference into the present application.

We claim:

1. A heater device suitable for heating a fluid to be applied to an object, said heater device comprising:
   heat exchange means for heating a fluid to be contacted with a substrate, said exchange means including first and second heat exchange elements, said heat exchange elements having at least one passage through which fluid to be heated passes;
   heating means disposed in a plane between said first and second heat exchange elements for heating said heat exchange means;
   fluid entry means in flow communication with said first and second heat exchange elements for admitting fluid to be heated into said at least one passage;
   fluid exit means in flow communication with said at least one passage for passing heated fluid from said at least one passage to said substrate to melt solder or the like thereon;
   said fluid entering through said fluid entry means and exiting through said fluid exit means flowing in generally the same direction as said plane of said heating means.

2. A heater device according to claim 1, wherein said first and second heat exchange elements each have at least one passage through which fluid to be heated passes.

3. A heater device according to claim 1, wherein each said heat exchange element has at least one channel in an outer surface of said element, and a cover plate mounted on said outer surface and covering said at least one channel to define said at least one passage 4. A heater device according to claim 3, wherein each said channel is semi-circular in cross-section 5. A heater device according to claim 3, wherein each said channel is trapezoidal in cross-section, with the shorter parallel side of the trapezium forming a base of said channel.

6. A heater device according to claim 1, wherein each said heat exchange element has at least one aperture extending longitudinally through said element.

7. A heater device according to claim 6, wherein each said aperture is circular in cross-section.

8. A heater device according to claim 1, wherein said heating means is an electrically operated stainless steel etched foil heater.

9. A heater device according to claim 8, wherein said stainless steel etched foil heater is disposed between said first and second heat exchange elements, whereby fluid passing through said at least one passage does not come into physical contact with said foil heater.

10. A heater device according to claim 9, wherein said foil heater is disposed between insulating layers for electrically insulating said foil heater from said first and second heat exchange elements.

11. A heater device according to claim 1, wherein said fluid exit means include a nozzle having a fluid entrance at one end and a fluid exit at the other end, said fluid entrance being operatively connected to said heat exchange means.

12. A heater device according to claim 11, wherein said fluid exit is a narrow elongate opening, whereby fluid heated by said heat exchange means exits said fluid exit as a narrow elongate blast of heated fluid.

13. A heater device according to claim 12, wherein a heat resistant compliant material is disposed around a periphery of said fluid exit for sealing said nozzle against said substrate.

14. A heater device according to claim 13, wherein said heat resistant compliant material is silicone rubber.

* * * * *